(12) United States Patent
Falk

(10) Patent No.: US 7,573,419 B2
(45) Date of Patent: Aug. 11, 2009

(54) METHOD AND SYSTEM FOR UNAMBIGUOUS ANGLE RESOLUTION OF A SPARSE WIDE-BAND ANTENNA ARRAY

(75) Inventor: Kent Olof Falk, Mölnlycke (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 375 days.

(21) Appl. No.: 10/557,466

(22) PCT Filed: May 21, 2003

(86) PCT No.: PCT/SE03/00833

§ 371 (c)(1),
(2), (4) Date: Nov. 18, 2005

(87) PCT Pub. No.: WO2004/104628

PCT Pub. Date: Dec. 2, 2004

(65) Prior Publication Data

US 2006/0250299 A1    Nov. 9, 2006

(51) Int. Cl.
*G01S 13/00* (2006.01)
(52) U.S. Cl. .................. 342/147; 342/90; 342/126; 342/133; 342/139; 342/146
(58) Field of Classification Search .............. 342/146
See application file for complete search history.

(56) References Cited

U.S. PATENT DOCUMENTS

| | | | |
|---|---|---|---|
| 3,281,842 A | 10/1966 | Cerar et al. | |
| 3,346,862 A | 10/1967 | Raudeep | |

(Continued)

FOREIGN PATENT DOCUMENTS

RU    2101717    10/1988

(Continued)

OTHER PUBLICATIONS

*Ultra-Wideband Beamforming in Sparse Arrays*, In: Microwaves, Antennas and Propagation, IEE Proceedings H, vol. 138, No. 4, Aug. 1991, pp. 342-346.

(Continued)

*Primary Examiner*—Thomas H Tarcza
*Assistant Examiner*—Timothy A Brainard
(74) *Attorney, Agent, or Firm*—Nixon & Vanderhye P.C.

(57) ABSTRACT

The present inventive concept for bistatic or monostatic radar utilization discloses a method and a system for unambiguous angle resolution of a sparse wide-band array antenna by utilizing an ultra wide-band signal, generally a wide-band noise signal which may be continuous bandwidth limited white or colored noise. The noise signal is typically generated and radiated by a transmitting antenna covering the entire reception range of a receiving sparse antenna array. An echo signal is received by the sparse receiving array containing n antenna elements, which are generally positioned with separation distances of several wavelengths without creating strong grating lobes due to the type of generated transmit signal. By means of a selected auto-correlation function defining the wide-band noise signal power spectrum, the convolution of the radiated output signal and the received echo input signal will give the target range information, the individual time-delay setting for each antenna element will give an unambiguous angular resolution.

16 Claims, 8 Drawing Sheets

U.S. PATENT DOCUMENTS

| | | | |
|---|---|---|---|
| 3,441,931 A | 4/1969 | Shrader | |
| 4,042,928 A | 8/1977 | Altes | |
| 4,099,182 A | 7/1978 | Ward | |
| 4,114,153 A | 9/1978 | Neidell | |
| 4,150,378 A | 4/1979 | Barton | |
| 4,450,531 A | 5/1984 | Kenyon et al. | |
| 4,644,356 A | 2/1987 | Yamano | |
| 4,719,468 A | 1/1988 | Jehle et al. | |
| 4,894,660 A | 1/1990 | Thomson et al. | |
| 5,093,670 A * | 3/1992 | Braathen | 343/792.5 |
| 5,140,332 A | 8/1992 | Martin et al. | |
| 5,210,820 A | 5/1993 | Kenyon | |
| 5,351,053 A | 9/1994 | Wicks et al. | |
| 5,446,461 A | 8/1995 | Frazier | |
| 5,519,400 A | 5/1996 | McEwan | |
| 5,644,314 A | 7/1997 | Ahmad et al. | |
| 5,734,346 A * | 3/1998 | Richardson et al. | 342/124 |
| 5,877,726 A * | 3/1999 | Kudoh et al. | 343/700 MS |
| 6,014,099 A | 1/2000 | Bennett et al. | |
| 6,075,479 A | 6/2000 | Kudoh | |
| 6,114,987 A | 9/2000 | Bjornholt | |
| 6,115,113 A * | 9/2000 | Flockencier | 356/5.01 |
| 6,131,013 A | 10/2000 | Bergstrom et al. | |
| 6,147,658 A * | 11/2000 | Higashi et al. | 343/853 |
| 6,397,154 B1 | 5/2002 | Jones et al. | |
| 6,518,914 B1 * | 2/2003 | Peterson et al. | 342/25 R |
| 6,539,308 B2 | 3/2003 | Monk et al. | |
| 7,065,162 B1 * | 6/2006 | Sorrells et al. | 375/343 |
| 7,109,939 B2 * | 9/2006 | Lynch et al. | 343/771 |
| 2002/0085624 A1 | 7/2002 | Lomp | |
| 2002/0190915 A1 | 12/2002 | Barnes et al. | |
| 2003/0063597 A1 * | 4/2003 | Suzuki | 370/347 |
| 2004/0066331 A1 | 4/2004 | Poullin | |
| 2006/0109173 A1 | 5/2006 | Erikmats et al. | |

FOREIGN PATENT DOCUMENTS

| | | |
|---|---|---|
| RU | 2166769 | 10/2001 |
| WO | WO 0159473 A2 * | 8/2001 |

OTHER PUBLICATIONS

Strifors et al., *Scattering of short EM-pulses by simple and complex targets in the combined time-frequency domain using impulse radar*, Record of the 1993 IEEE National Radar Conference, Apr. 20-22, 1993, pp. 70-75.

Anderson et al., *Ultra-wideband beamforming in sparse arrays*, Microwaves, Antennas and Propagation, IEEE Proceedings H, vol. 138, No. 4, Aug. 1991, pp. 342-346.

Translation of Decision on Grant mailed Feb. 29, 2008 in corresponding Russian Application No. 2006119635/09(021336).

U.S. Appl. No. 11/487,585, filed Jul. 13, 2006, Inventor: Kent Olof Falk.

U.S. Appl. No. 11/557,768, filed Nov. 21, 2005, Inventor: Kent Olof Falk.

Office Action mailed Jun. 21, 2007 in co-pending U.S. Appl. No. 10/557,768.

Office Action mailed Dec. 7, 2007 in co-pending U.S. Appl. No. 10/557,768.

Office Action mailed Jul. 2, 2008 in co-pending U.S. Appl. No. 10/577,768.

* cited by examiner

METHOD AND SYSTEM FOR UNAMBIGUOUS ANGLE RESOLUTION OF A SPARSE WIDE-BAND ANTENNA ARRAY

This application is the U.S. national phase of international application PCT/SE2003/000833 filed 21 May 2003 which designated the U.S., the entire contents of which is hereby incorporated by reference.

TECHNICAL FIELD

The present invention relates to wide-band antenna arrays, and more particularly to a method and system for unambiguous angle resolution of a sparse wide-band antenna array.

BACKGROUND

It is complicated or even almost impossible to build classic wide-band array antennas providing good angle resolution. The reason for this is that the separation of the elements is set by the highest frequency, typically half a wavelength at $f_{max}$. The physical size of the elements is set by the lowest frequency, typically half a wavelength at $f_{min}$. Thus, there is apparently a contradiction between obtaining a wide bandwidth of the antenna and the array density needed to avoid grating lobes at large scan angles.

Another problem is that array antennas having a large number of elements will be undesired complex and expensive. Furthermore rotating antennas are generally undesired as that implies further mechanical complexity. From a strategic point of view there is also a desire to be able to keep peak power as low as possible to minimize the risk of being detected.

Typical solutions of today utilize fully filled arrays and rotating antennas combined with range coded long pulses, for instance using a binary phase code. Signal classification is difficult with present solutions and different hardware solutions have to be used for a respective function category, for instance, a radar function or a jamming function.

Therefore there is a demand for further improvements of wide-band arrays for obtaining also a better angular resolution produced by a less complex solution compared to the state of the art.

SUMMARY OF THE INVENTION

A method and a system for unambiguous angle resolution of a sparse wide-band array antenna in a bistatic or monostatic radar configuration utilize an ultra-wide-band signal, which in a typical embodiment may be continuous bandwidth limited white noise or colored noise. The noise signal is generated and radiated for instance by an omnidirectional transmitting antenna covering the entire reception range of a receiving array. An echo signal is received by the receiving array containing n antenna elements. The n antenna elements are generally positioned with separation distances of several wavelengths without creating strong grating lobes. By means of a selected auto-correlation function defining the wide-band noise signal power spectrum, the convolution of the radiated output signal and the received echo input signal will give the target range information, the individual time-delay setting for each antenna element will give an unambiguous angular resolution.

A system according to the present invention is set forth by the independent claim 1, and further embodiments of the invention are set forth by the dependent claims 2 to 9.

Further a method according to the present invention is set forth by the independent claim 10, and further embodiments are defined by the dependent claims 11 to 17.

SHORT DESCRIPTION OF THE DRAWINGS

The invention, together with further objects and advantages thereof, may best be understood by referring to the following detailed description taken together with the accompanying drawings, in which.

DETAILED DESCRIPTION

In a typical illustrative embodiment a very broad-banded signal, which may be continuous band-limited white or colored noise is generated and transmitted by an antenna, which for instance is isotropic in its horizontal plane. The echo signal in a bistatic or monostatic configuration is received by n receiver antennas. The n antennas are spaced at distances of several wavelengths, e.g. 10 wavelengths at $f_{min}$. These antennas being placed at separation distances of several wavelengths do not create dominating grating lobes due to the frequency spread achieved by the large bandwidth. By grating lobes we refer to periodic repetitions of a main lobe.

Figure 1:
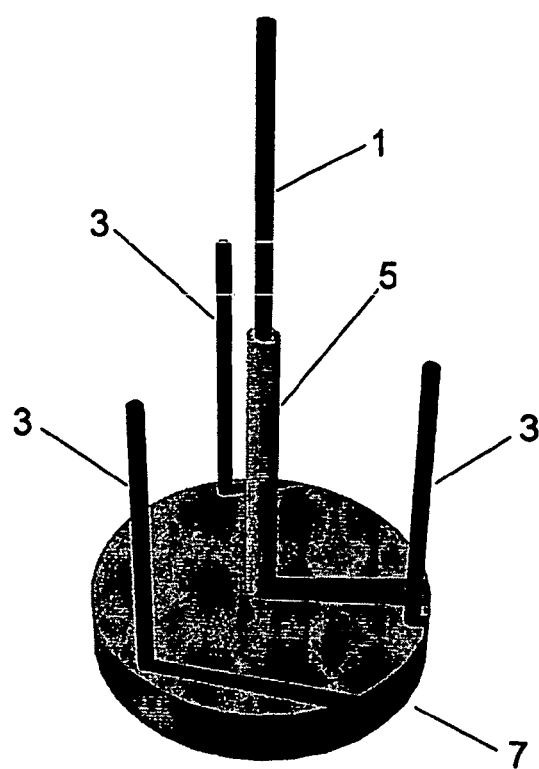
FIG. 1 illustrates an illustrative array antenna according to the present inventive concept.
Figure 2:
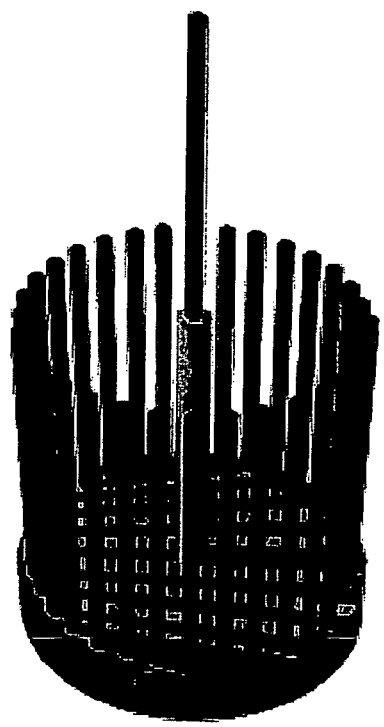
FIG. 2 illustrates a principal embodiment of a wide-band array according to the present invention having the number of receiving antenna elements n=32.

Each antenna may be a vertical array to increase the gain in the horizontal plane. To minimize leakage between the transmitting antenna and the receiver antennas the transmitting antenna preferably is positioned as far as possible from the receiving antennas and for instance at a different height than the receiving antennas. FIG. 1 illustrates a principal shape with n=3, the transmitting antenna is denoted as 1 and the receiver antennas are denoted 3. A structure carrying the transmitter antenna is denoted as reference number 5. A transmitter and n receivers with accompanying signal processing is housed in the electronic unit 7. FIG. 2 illustrates a practical embodiment of a circular array with n=32, the transmitting antenna sitting elevated in the middle and the receiving antenna in a ring below. One transmitter, n receivers with accompanying signal processing being housed in the base of the array.

The idea of using a continuous ultra broad-band signal like band-limited white noise is, that only the central lobe can be considered additive for all frequencies within the wide band used. Grating lobes resulting from the different frequencies within the broadband signal will not be added in the same way as the grating lobe pattern will for each separate frequency component being a function of the spacing of antenna elements used. This will result in an angle resolution, which may be used, for instance, for radar purposes. This was simulated in a frequency range of 6-18 GHz, which can simply be obtained. The distance to the target is determined by finding the peaks in the convolution between the input and output signal.

Principle for Range Resolution

Assume an array wherein the main lobe of each antenna element points in a radial direction in the circular case and in a direction $\theta=0$ in the linear case. Further assume that the diagrams of the elements have the simple frequency independent form according to Equation (1):

$$EL(\theta) = \begin{vmatrix} \cos(\theta) & \text{if} & \cos(\theta) > 0 \\ 0 & \text{if} & \cos(\theta) \leq 0 \end{vmatrix} \quad (1)$$

The radiated noise signal is assumed to be $e_t(t)$. The sum from all n receiver antennas may then for a spot target be written according to Equation (2):

$$e_r(t) = \begin{cases} EL(\theta) \cdot \sum_{n=0}^{N-1} e_t\left(t - \frac{2 \cdot R}{c_0} + \tau_n(\phi) - \tau_n(\theta)\right) & \text{Linear array} \\ \sum_{n=0}^{N-1} e_t\left(t - \frac{2 \cdot R}{c_0} + \tau_n(\phi) - \tau_n(\theta)\right) \cdot EL\left(\theta - n \cdot \frac{2\pi}{N}\right) & \text{Circular array} \end{cases} \quad (2)$$

Where R, $\phi$ are distance and bearing, respectively, to the target. $\theta$ means current antenna search angle. Time corrections $\tau_n$ are calculated according to Equation (3):

$$\tau_n(\phi) = \begin{cases} \frac{n}{N-1} \cdot \frac{L}{c_0} \cdot \sin(\phi) & \text{Linear array} \\ \frac{D}{2 \cdot c_0} \cdot \cos\left(\phi - n \cdot \frac{2\pi}{N}\right) & \text{Circular array} \end{cases} \quad (3)$$

Convolution between the radiated and the received signal can, according to Equation (4), be written:

$$S_{ee}(t) = E[e_t(t) * e_r(t)] = E[\mathcal{F}^{-1}\{\mathcal{F}\{e_t(t)\} \cdot \mathcal{F}\{e_r(t)\}\}] = \quad (4)$$

$$E\left[\mathcal{F}^{-1}\left\{[\mathcal{F}\{e_t(t)\}]^2 \cdot \sum_{n=0}^{N-1} e^{j\omega\left(-\frac{2 \cdot R}{c_0} + \tau_n(\phi) - \tau_n(\theta)\right)} \cdot \begin{Bmatrix} EL(\theta) & \text{Linear array} \\ EL\left(\theta - n \cdot \frac{2\pi}{N}\right) & \text{Circular array} \end{Bmatrix}\right\}\right] =$$

$$E\left[\mathcal{F}^{-1}\left\{\left[\begin{cases} \sqrt{\frac{\pi \cdot \sigma^2}{\omega_2 - \omega_1}} & \omega_1 \leq |\omega| \leq \omega_2 \\ 0 & \text{Otherwise} \end{cases}\right]^2 \cdot \right.\right.$$

$$\sum_{n=0}^{N-1} e^{j\omega\left(-\frac{2 \cdot R}{c_0} + \tau_n(\phi) - \tau_n(\theta)\right)} \cdot$$

$$\left.\left.\begin{Bmatrix} EL(\theta) & \text{Linear array} \\ EL\left(\theta - n \cdot \frac{2\pi}{N}\right) & \text{Circular array} \end{Bmatrix}\right\}\right] =$$

$$E\left[\frac{1}{2\pi} \cdot \int_{-\omega_2}^{-\omega_1} \left\{\frac{\pi \cdot \sigma^2}{\omega_2 - \omega_1} \cdot \sum_{n=0}^{N-1} e^{j\omega\left(-\frac{2 \cdot R}{c_0} + \tau_n(\phi) - \tau_n(\theta)\right)} \cdot \right.\right.$$

$$\left.\begin{Bmatrix} EL(\theta) & \text{Linear array} \\ EL\left(\theta - n \cdot \frac{2\pi}{N}\right) & \text{Circular array} \end{Bmatrix}\right\} \cdot$$

$$e^{j\omega t} \cdot d\omega + \frac{1}{2\pi} \cdot \int_{\omega_1}^{\omega_2} \left\{\frac{\pi \cdot \sigma^2}{\omega_2 - \omega_1} \cdot \right.$$

$$\sum_{n=0}^{N-1} e^{j\omega\left(-\frac{2 \cdot R}{c_0} + \tau_n(\phi) - \tau_n(\theta)\right)} \cdot$$

$$\left.\left.\begin{Bmatrix} EL(\theta) & \text{Linear array} \\ EL\left(\theta - n \cdot \frac{2\pi}{N}\right) & \text{Circular array} \end{Bmatrix}\right\} \cdot$$

$$\left.e^{j\omega t} \cdot d\omega\right] = \frac{1}{2} \cdot \frac{\sigma^2}{\omega_2 - \omega_1} \cdot$$

$$\sum_{n=0}^{N-1} \begin{Bmatrix} EL(\theta) & \text{Linear array} \\ EL\left(\theta - n \cdot \frac{2\pi}{N}\right) & \text{Circular array} \end{Bmatrix} \cdot$$

$$\int_{\omega_1}^{\omega_2} \left\{ e^{j\omega\left(t - \frac{2 \cdot R}{c_0} + \tau_n(\phi) - \tau_n(0)\right)} + e^{-j\omega\left(t - \frac{2 \cdot R}{c_0} + \tau_n(\phi) - \tau_n(\theta)\right)} \right\} \cdot$$

$$d\omega =$$

$$\frac{\sigma^2}{\omega_2 - \omega_1} \cdot \sum_{n=0}^{N-1} \begin{Bmatrix} EL(\theta) & \text{Linear array} \\ EL\left(\theta - n \cdot \frac{2\pi}{N}\right) & \text{Circular array} \end{Bmatrix} \cdot$$

$$\int_{\omega_1}^{\omega_2} \cos\left[\omega \cdot \left(t - \frac{2 \cdot R}{c_0} + \tau_n(\phi) - \tau_n(\theta)\right)\right] \cdot d\omega =$$

$$\frac{\sigma^2}{\omega_2 - \omega_1} \cdot \sum_{n=0}^{N-1} \begin{Bmatrix} EL(\theta) & \text{Lin.} \\ EL\left(\theta - n \cdot \frac{2\pi}{N}\right) & \text{Cir.} \end{Bmatrix} \cdot$$

$$\frac{\sin\left[\omega_2 \cdot \left(t - \frac{2 \cdot R}{c_0} + \tau_n(\phi) - \tau_n(\theta)\right)\right] - \sin\left[\omega_1 \cdot \left(t - \frac{2 \cdot R}{c_0} + \tau_n(\phi) - \tau_n(\theta)\right)\right]}{t - \frac{2 \cdot R}{c_0} + \tau_n(\phi) - \tau_n(\theta)}$$

Where ✻denotes the Fourier transform. We have assumed that $e_t(t)$ is white bandwidth limited noise from $\omega_1$ to $\omega_2$.

Principle for Angle Resolution

The principle for resolution in angular direction is that grating lobes of respective frequency will land in different directions. The level of other lobes than the main lobe seen over the entire bandwidth will be expected to be low as grating lobes over the wide bandwidth generally will counteract each other. The radiated noise signal is assumed to be $e(t)$. $R_{ee}(\tau)$ is the auto-correlation function of $e(t)$. If we presume that $e(t)$ is white bandwidth limited noise from $\omega_1$ to $\omega_2$ it is easy to prove that the auto-correlation function can be written according to Equation (5) below:

$$R_{ee}(\tau) = \sigma^2 \cdot \cos\left[(\omega_2 + \omega_1) \cdot \frac{\tau}{2}\right] \cdot \frac{\sin\left[(\omega_2 - \omega_1) \cdot \frac{\tau}{2}\right]}{(\omega_2 - \omega_1) \cdot \frac{\tau}{2}} \quad (5)$$

Here $\sigma$ denotes the noise standard deviation and the mean power of the noise signal is $\sigma^2$.

Linear Array

For a basic first emrbodiment of the present invention assume a linear array with a length L where the main lobe of each antenna element points in the direction $\theta=0$ and has the simple frequency independent shape according to Equation (6):

$$EL(\theta) = \begin{vmatrix} \cos(\theta) & \text{if} & \cos(\theta) > 0 \\ 0 & \text{if} & \cos(\theta) \leq 0 \end{vmatrix} \quad (6)$$

The sum of all n receiver antennas then can be written according to Equation (7):

$$E_\Sigma(\theta) = EL(\theta) \cdot \sum_{n=0}^{N-1} e\left(t - \frac{2 \cdot R}{c_0} + \tau_n(\phi) - \tau_n(\theta)\right) \quad (7)$$

Where R, $\phi$ are distance and bearing to the target, respectively. $\theta$ is the current antenna search angle. Time corrections $\tau_n$ are calculated according to Equation (8):

$$\tau_n(\phi) = \frac{n}{(N-1)} \cdot \frac{L}{c_0} \cdot \sin(\phi) \quad (8)$$

Expected value of the antenna diagram $AP(\theta, \phi)$ is calculated according to Equation 9:

$$AP(\theta,\phi) = 10 \cdot \log\{E[E_\Sigma^2(\theta,\phi)]\} \quad (9)$$

We will now be able to perform the following calculation:

$$E[E_\Sigma^2(\theta, \phi)] = E\left[\left(EL\left(\theta - n \cdot \frac{2\pi}{N}\right) \cdot \sum_{n=0}^{N-1} e\left(t - \frac{2 \cdot R}{c_0} + \tau_n(\phi) - \tau_n(\theta)\right)\right)^2\right] =$$

$$E\left[(EL(\theta))^2 \cdot \sum_{n=0}^{N-1} e\left(t - \frac{2 \cdot R}{c_0} + \tau_n(\phi) - \tau_n(\theta)\right) \cdot \sum_{m=0}^{N-1} e\left(t - \frac{2 \cdot R}{c_0} + \tau_m(\phi) - \tau_m(\theta)\right)\right] =$$

$$E\left[(EL(\theta))^2 \sum_{n=0}^{N-1}\sum_{m=0}^{N-1} e\left(t - \frac{2 \cdot R}{c_0} + \tau_n(\phi) - \tau_n(\theta)\right) \cdot e\left(t - \frac{2 \cdot R}{c_0} + \tau_m(\phi) - \tau_m(\theta)\right)\right] = (EL(\theta))^2 \sum_{n=0}^{N-1}\sum_{m=0}^{N-1} E\left[e\left(t - \frac{2 \cdot R}{c_0} + \tau_n(\phi) - \tau_n(\theta)\right) \cdot e\left(t - \frac{2 \cdot R}{c_0} + \tau_m(\phi) - \tau_m(\theta)\right)\right] =$$

-continued $$(EL(\theta))^2 \cdot \sum_{n=0}^{N-1}\sum_{m=0}^{N-1} R_{ee}(\tau_n(\phi) - \tau_n(\theta) - \tau_m(\phi) + \tau_m(\theta))$$

Figure 6:
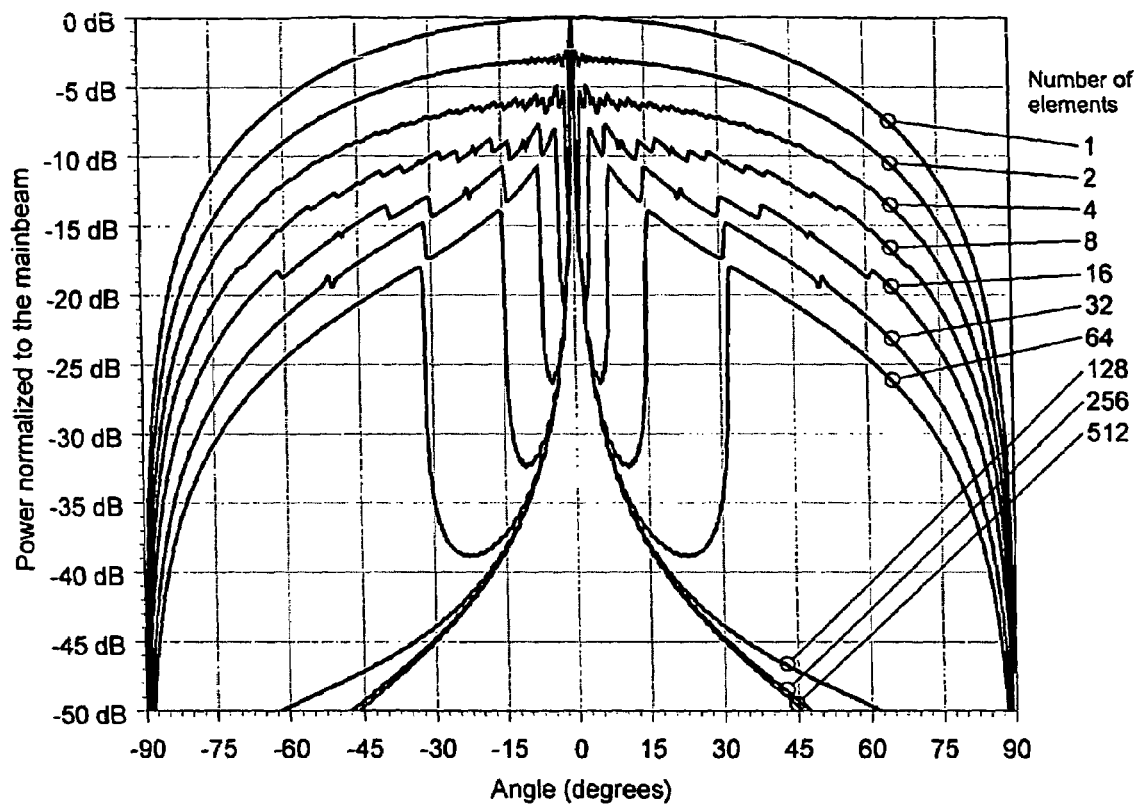
FIG. 6 illustrates a wide-band pattern for a linear receive array containing a binary number of 1 to 512 elements for a central noise transmitter.

FIG. 6 illustrates power normalized to the main beam as function of angle −90 to +90 degrees for variation of number of elements in binary steps from 1 to 512. As can be seen already with 8 elements a good angular resolution is obtained with a surrounding signal level at −10 dB.

Circular Array

For a second embodiment of the present invention assume a circular array having the main lobe of each antenna element pointing in a radial direction and according to Equation (10) has the simple frequency independent shape:

$$EL(\theta) = \begin{vmatrix} \cos(\theta) & \text{if} & \cos(\theta) > 0 \\ 0 & \text{if} & \cos(\theta) \leq 0 \end{vmatrix} \quad (10)$$

The sum, from all n receiving antennas then can be written according to Equation (11):

$$E_\Sigma(\theta) = \sum_{n=0}^{N-1} e\left(t - \frac{2 \cdot R}{c_0} + \tau_n(\phi) - \tau_n(\theta)\right) \cdot EL\left(\theta - n \cdot \frac{2\pi}{N}\right) \quad (11)$$

R, $\phi$ are distance and bearing to the target, respectively, and $\theta$ is the current antenna search angle. Time corrections $\tau_n$ are calculated according to Equation (12):

$$\tau_n(\phi) = \frac{D}{2 \cdot c_0} \cdot \cos\left(\phi - n \cdot \frac{2\pi}{N}\right) \quad (12)$$

Expected value of the antenna diagram $AP(\theta, \phi)$ is calculated according to Equation (13):

$$AP(\theta,\phi) = 10 \cdot \log\{E[E_\Sigma^2(\theta,\phi)]\} \quad (13)$$

Then, we can perform the following calculation:

$$E[E_\Sigma^2(\theta, \phi)] = E\left[\left(\sum_{n=0}^{N-1} e\left(t - \frac{2 \cdot R}{c_0} + \tau_n(\phi) - \tau_n(\theta)\right) \cdot EL\left(\theta - n \cdot \frac{2\pi}{N}\right)\right)^2\right] =$$

$$E\left[\sum_{n=0}^{N-1} e\left(t - \frac{2 \cdot R}{c_0} + \tau_n(\phi) - \tau_n(\theta)\right) \cdot EL\left(\theta - n \cdot \frac{2\pi}{N}\right) \cdot \sum_{m=0}^{N-1} e\left(t - \frac{2 \cdot R}{c_0} + \tau_m(\phi) - \tau_m(\theta)\right) \cdot EL\left(\theta - m \cdot \frac{2\pi}{N}\right)\right] =$$

$$E\left[\sum_{n=0}^{N-1}\sum_{m=0}^{N-1} e\left(t - \frac{2 \cdot R}{c_0} + \tau_n(\phi) - \tau_n(\theta)\right) \cdot EL\left(\theta - n \cdot \frac{2\pi}{N}\right) \cdot e\left(t - \frac{2 \cdot R}{c_0} + \tau_m(\phi) - \tau_m(\theta)\right) \cdot EL\left(\theta - m \cdot \frac{2\pi}{N}\right)\right] =$$

$$\sum_{n=0}^{N-1}\sum_{m=0}^{N-1} E\left[e\left(t - \frac{2 \cdot R}{c_0} + \tau_n(\phi) - \tau_n(\theta)\right) \cdot e\left(t - \frac{2 \cdot R}{c_0} + \tau_m(\phi) - \tau_m(\theta)\right)\right] \cdot EL\left(\theta - n \cdot \frac{2\pi}{N}\right) \cdot EL\left(\theta - m \cdot \frac{2\pi}{N}\right) =$$

-continued $$\sum_{n=0}^{N-1}\sum_{m=0}^{N-1} R_{ee}(\tau_n(\phi) - \tau_n(\theta) - \tau_m(\phi) + \tau_m(\theta)) \cdot$$

$$EL\left(\theta - n \cdot \frac{2\pi}{N}\right) \cdot EL\left(\theta - m \cdot \frac{2\pi}{N}\right)$$

Conformal Array

In yet a third embodiment the antenna array may well be formed as a conformal array and calculated in a similar way corresponding to the above examples of the linear and circular array.

Simulations

FIG. 3 demonstrates the auto-correlation function for white bandwidth limited noise according to equation (5). As can be seen a bandwidth of 100% is needed to get the sidelobes down to a reasonable level.

For the simulations 100% bandwidth and a center frequency of 12 GHz was chosen. In other words the frequency range of the radar was 6-18 GHz. The distance to the target is determined by finding the peaks of the convolution between input and output signal.

Figure 4:
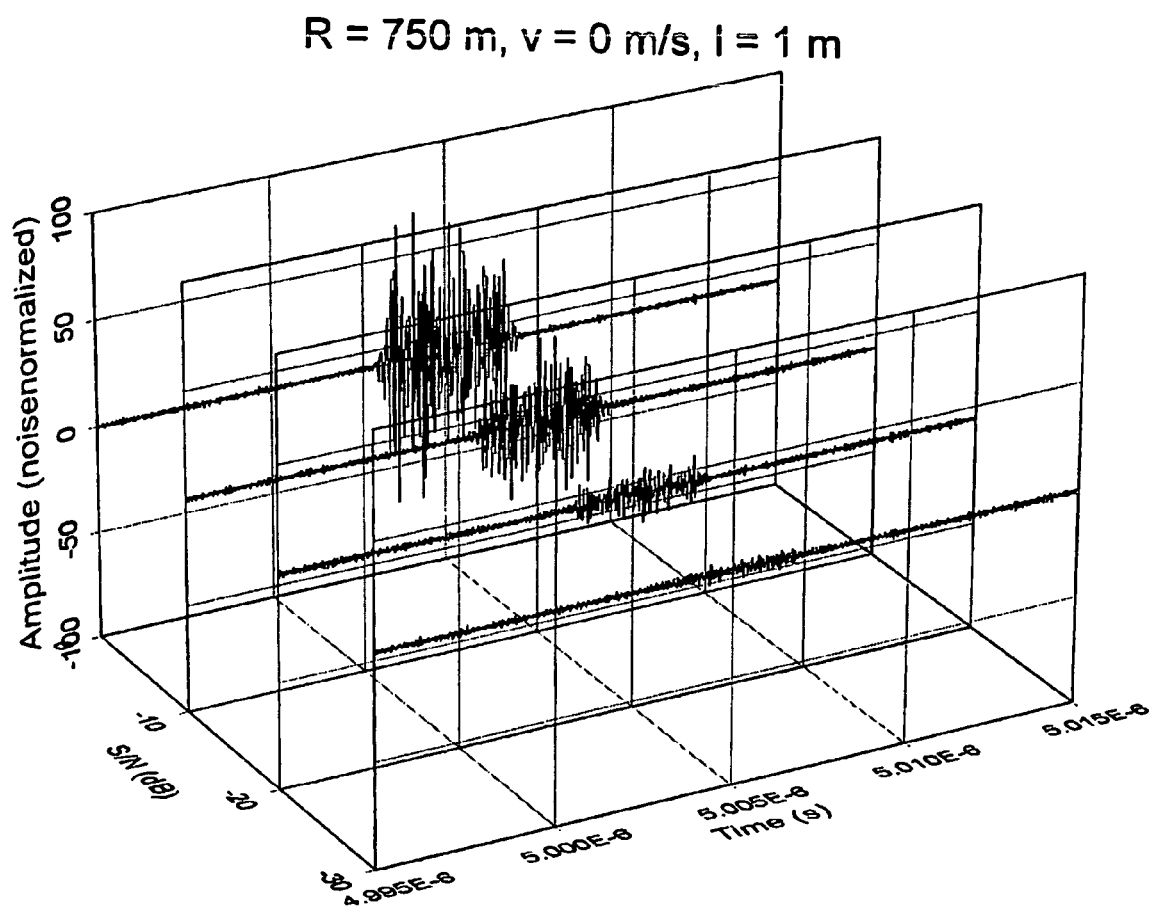
FIG. 4 illustrates in a graph the convolution of radiated and received signal as a function of signal-to-noise ratio.

FIG. 4 illustrates a simulation result when signal-to-noise was varied. In this case the target is an object, 1 meter long, standing still at a distance of 750 meters. The target area as function of distance is an equally distributed random number per distance sample. The sampling rate in this case was 50 GHz. From the response of the convolution the signature of the target can be interpreted in the form of the derivative of target area as function of distance. This may then be used to classify and identify the target by comparison with suitable library data.

Figure 5:
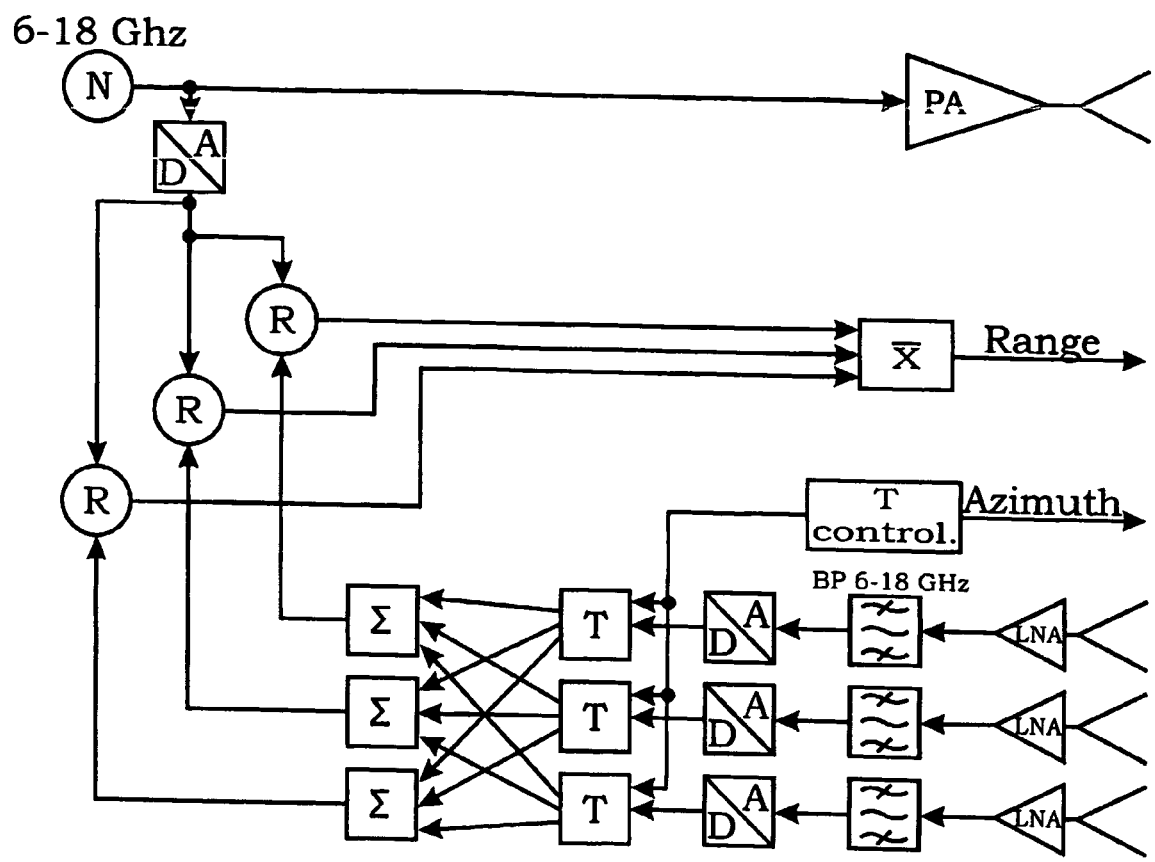
FIG. 5 illustrates in a block diagram three bearing channels.

FIG. 5 illustrates a principal block diagram of three bearing channels. Noise source N, antenna elements, power amplifier PA, filters and A/D converters are common for all bearing channels. By varying the time delays T the direction of the main lobe is selected. In a fully supported system many parallel bearing and distance channels are realized, such that the full solid angular sector continuously can be watched, for example almost ±90° for a linear receiving antenna array and ±180° for a circular receiver antenna array.

The principle for the angular resolution utilized is that grating lobes integrated over the large frequency range become rather low, while signals of a main lobe generally will be summed, which of course clearly comes out from the auto-correlation.

Figure 7:
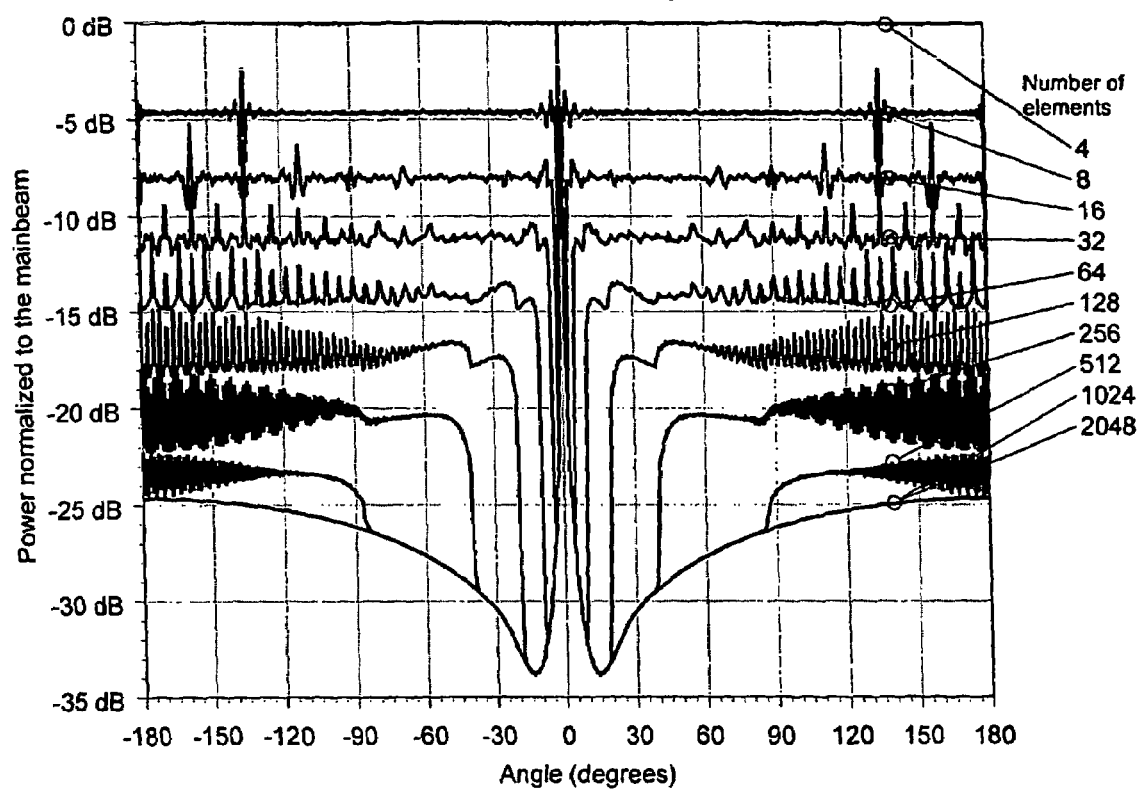
FIG. 7 illustrates a wide-band pattern for a circular receiver array containing a binary number of 4 to 2048 elements for a central omnidirectional noise transmitter.

FIG. 7 illustrates power normalized to the main beam as function of angle −180 to +180 degrees for variation of number of elements in binary steps from 4 to 2048. As can be seen already with 32 elements a good angular resolution is obtained at −12 dB. In this simulation for instance 8 elements correspond to an inter-element distance corresponding to around 8 wavelengths along the perimeter of the array. FIG. 7 further illustrates that a further increase of elements will not mean any significant further improvement from what is already achieved at element distances well above half a wavelength, i.e. 64 elements corresponding to two wavelengths at the lowest frequency. In standard thinking half a wavelength is generally the limit for avoiding grating lobes periodically repeating themselves in an array according to the state of the art.

As is also seen in FIGS. 6 and 7 the auto-correlation function for the radiated signal appears in the angular direction. Interesting is that the auto-correlation function as a matter of fact can be chosen such that desired characteristics are obtained. The Fourier transform of the selected auto-correlation function gives necessary power spectrum of the radiated signal.

It will be understood by those skilled in the art that various modifications and changes could be made to the present invention without departure from the spirit and scope thereof, which is defined by the appended claims.

The invention claimed is:

1. A system for unambiguous angular resolution in connection with a sparse wide-band antenna array for bistatic or monostatic radar operation, comprising:
   a transmitter antenna with a single transmitting antenna element arranged to transmit an ultra wide-band microwave signal;
   a receiving microwave antenna array with n individual antenna elements generally distributed at distances of several wavelengths arranged to receive echoes from a target object as a sampled input signal; and
   a unit arranged to achieve a resulting radar range echo response as a convolution between sampled radiated wide-band output signal and sampled total input signal received by the receiving antenna array as echoes from the target object, the convolution result being read out as a signature of the target,
   wherein the single transmitting antenna element is an omnidirectional transmitter antenna in a monostatic circular configuration and is generally positioned at another height than the a receiving antenna elements to minimize leakage between transmit arid receive antennas.

2. The system according to claim 1, wherein the ultra wide-band microwave signal is generated as band-limited white noise, the convolution result being read out as a signature of the target for 100% bandwidth approximately in form of the derivative of the target area as function of distance.

3. The system according to claim 1, wherein the ultra wide-band microwave signal is generated as band-limited colored noise, by using a selected auto-correlation function for the generated noise.

4. The system according to claim 1, wherein the ultra wide-band microwave signal comprises a frequency range of the same order as the center frequency.

5. The system according to claim 1, wherein the receiving antenna arrays is a linear arrays.

6. The system according to claim 1, wherein the receiving antenna arrays is a circular arrays.

7. The system according to claim 6, wherein the transmitter antenna and the n receiving antenna elements are omnidirectional.

8. The system according to claim 1, wherein the receiving antenna array is formed as an conformal array.

9. A method for obtaining unambiguous angular resolution in connection with a sparse wide-band antenna array for bistatic or monostatic radar operation, comprising:
   generating an ultra wide-band band microwave signal being radiated via a transmitter antenna with a single transmitting antenna element;
   arranging a receiving microwave antenna array with n individual antenna elements generally distributed at distances of several wavelengths to receive echoes from a target object as a sampled input signal;
   achieving a resulting radar range echo response by a convolution between sampled radiated ultra wide-band output signal and sampled total input signal received by the receiving antenna array as echoes from the target object; and reading out the result of the convolution as a signature of the target, wherein the signal transmitting antenna element is an omnidirectional transmitter antenna in a. monostatic circular configuration and is generally positioned at another height than the n receiving antenna elements to minimize leakage between the transmit and receive antennas.

10. The method according to claim 9, further comprising generating the ultra wide-band microwave signal as band-limited white noise, and reading out the convolution result as a signature of the target for 100% bandwidth approximately in form of the derivative of the target area as function of distance.

11. The method according to claim 9, further comprising generating the ultra wide-band microwave signal as band-limited colored noise by using a selected auto-correlation function for the generated noise.

12. The method according to claim 9, further comprising generating the ultra wide-band microwave signal in a frequency range having an order about equal to the value of the center frequency.

13. The method according to claim 9, further comprising using a linear arrays as receiving antenna.

14. The method according to claim 9, further comprising using a circular arrays as receiving antenna.

15. The method according to claim 14, further comprising making the transmitter antenna and the n receiving antenna elements omnidirectional.

16. The method according to claim 9, further comprising using conformal array as receiving antenna.

* * * * *

UNITED STATES PATENT AND TRADEMARK OFFICE
CERTIFICATE OF CORRECTION

PATENT NO. : 7,573,419 B2  
APPLICATION NO. : 10/557466  
DATED : August 11, 2009  
INVENTOR(S) : Falk Page 1 of 1

Figure 3A:
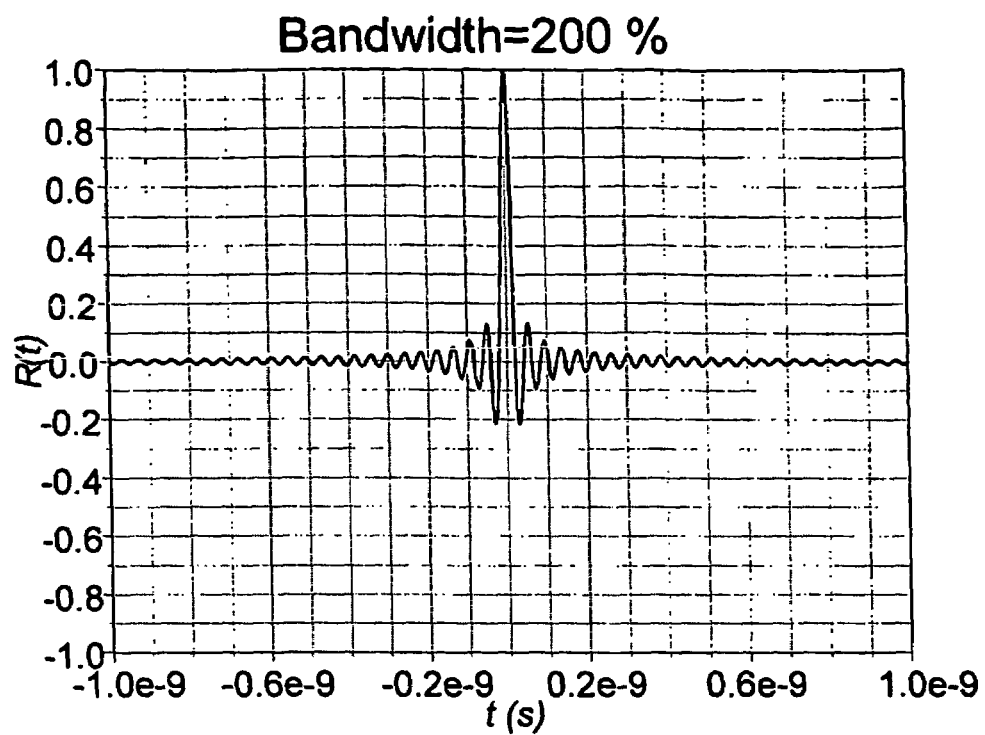
FIG. 3 illustrates in a number of graphs a) to f) the auto-correlation function for white bandwidth limited noise using a bandwidth from 200% and down to 6.25%.
Figure 3B:
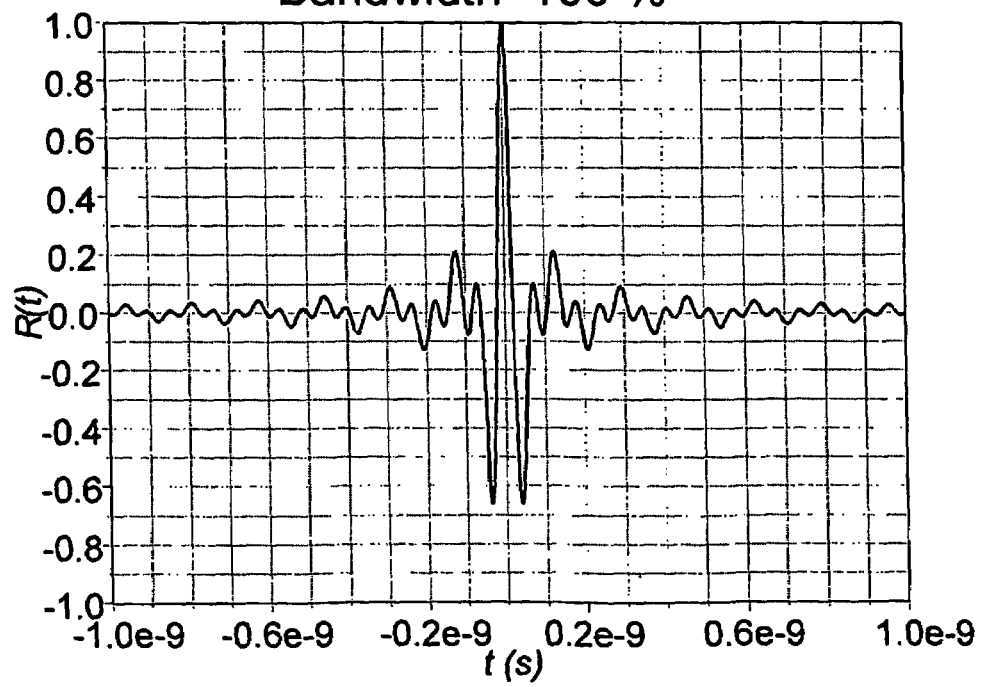
Figure 3C:
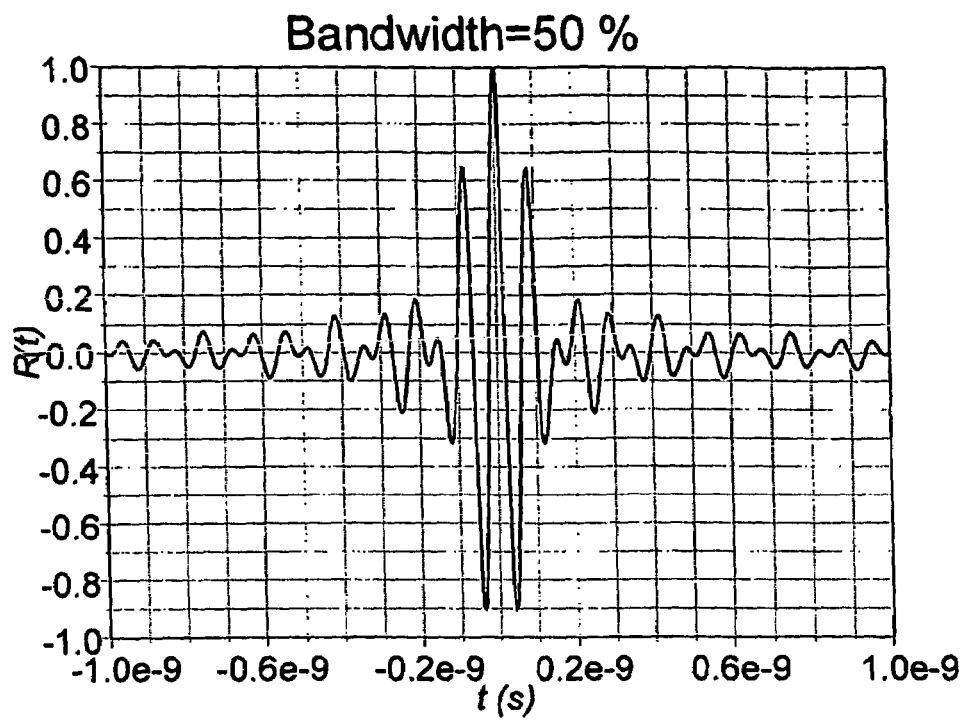
Figure 3D:
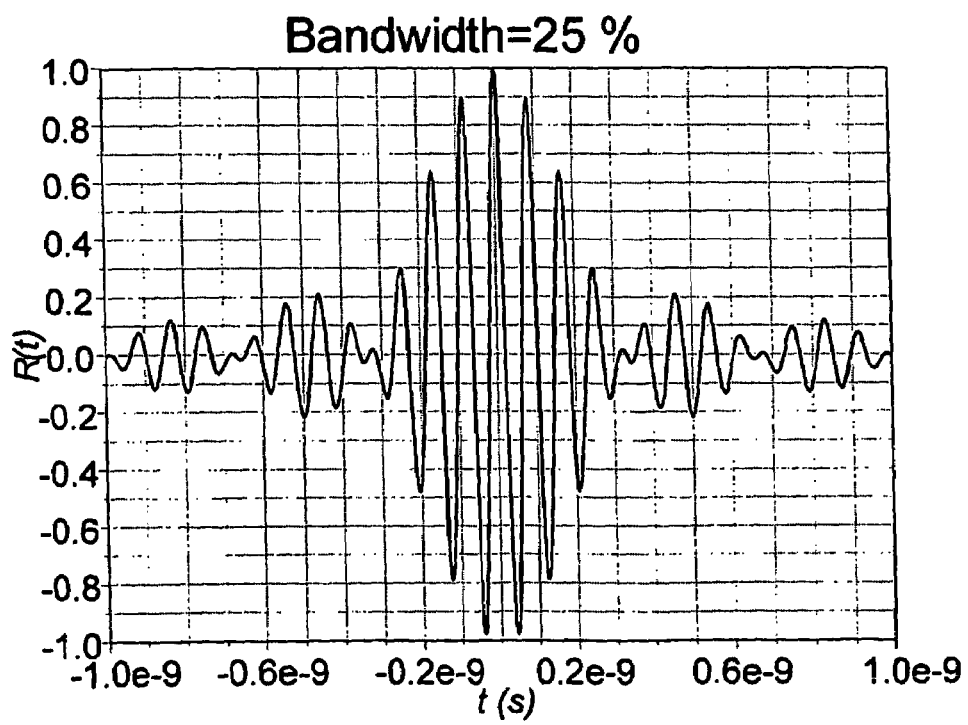
Figure 3E:
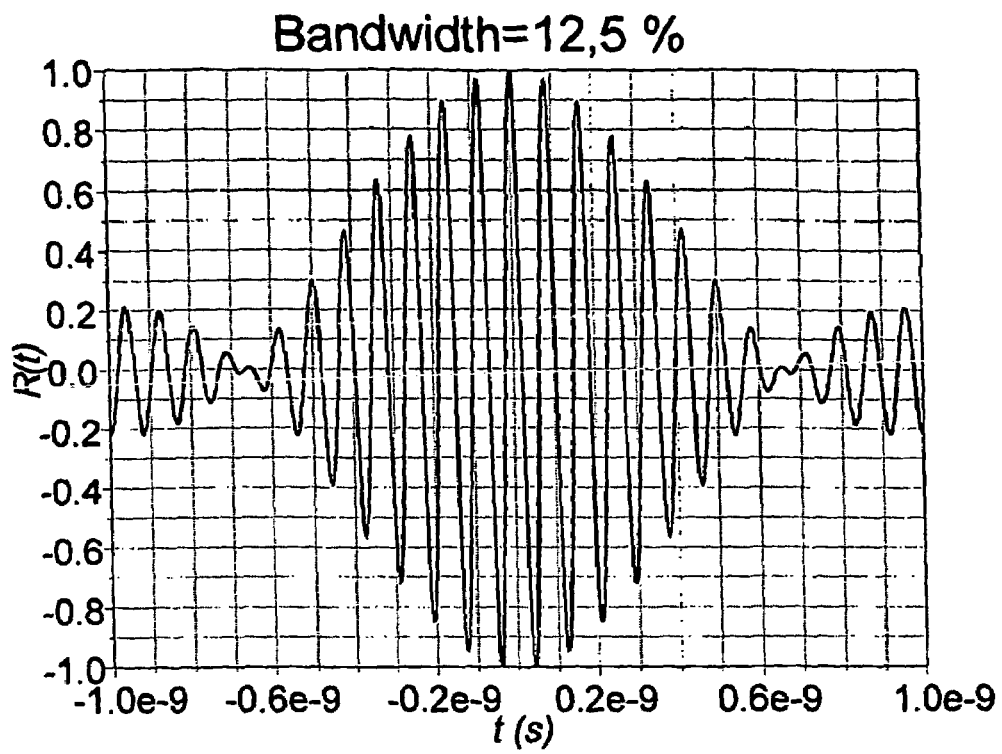

It is certified that error appears in the above-identified patent and that said Letters Patent is hereby corrected as shown below:

In Fig. 3e, Sheet 4 of 8, Line 1, delete "12,5 %" and insert -- 12.5 % --, therefor.

Figure 3F:
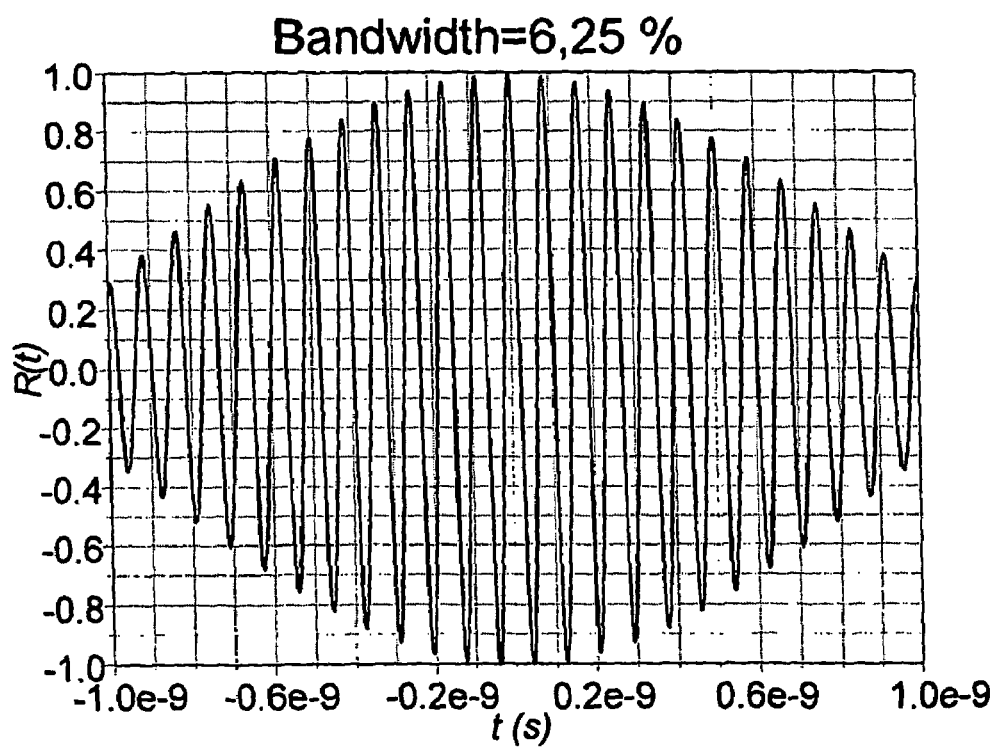

In Fig. 3f, Sheet 4 of 8, Line 1, delete "6,25 %" and insert -- 6.25 % --, therefor.

In Column 4, Line 30, delete "-$\tau_n(0)$)" and insert -- -$\tau_n(\theta)$) --, therefor.

In Column 4, Line 53, delete "  " and insert -- -- , therefor.

In Column 8, Line 29, in Claim 1, delete "a" and insert -- n --, therefor.

In Column 8, Line 30, in Claim 1, delete "arid" and insert -- and --, therefor.

In Column 9, Line 3, in Claim 9, delete "signal" and insert -- single --, therefor.

In Column 9, Line 4, in Claim 9, delete "a." and insert -- a --, therefor.

Signed and Sealed this

Thirteenth Day of July, 2010

David J. Kappos  
*Director of the United States Patent and Trademark Office*